United States Patent
Franciosa

(10) Patent No.: US 11,409,921 B2
(45) Date of Patent: Aug. 9, 2022

(54) METHOD AND SYSTEM FOR DISPOSING A PLURALITY OF LIGHTING DEVICES

(71) Applicant: Ledworks Srl, Milan (IT)

(72) Inventor: Marco Franciosa, Genoa (IT)

( * ) Notice: Subject to any disclaimer, the term of this patent is extended or adjusted under 35 U.S.C. 154(b) by 0 days.

(21) Appl. No.: 16/761,689

(22) PCT Filed: Nov. 6, 2018

(86) PCT No.: PCT/IB2018/058696
§ 371 (c)(1),
(2) Date: May 5, 2020

(87) PCT Pub. No.: WO2019/087165
PCT Pub. Date: May 9, 2019

(65) Prior Publication Data
US 2021/0182445 A1    Jun. 17, 2021

(30) Foreign Application Priority Data

Jun. 11, 2017    (IT) .......................... 102017000126026

(51) Int. Cl.
| | |
|---|---|
| *G06F 30/13* | (2020.01) |
| *F21S 4/10* | (2016.01) |
| *G06F 30/12* | (2020.01) |
| *G06F 111/18* | (2020.01) |
| *F21W 121/04* | (2006.01) |

(52) U.S. Cl.
CPC ............... *G06F 30/13* (2020.01); *F21S 4/10* (2016.01); *G06F 30/12* (2020.01); *F21W 2121/04* (2013.01); *G06F 2111/18* (2020.01)

(58) Field of Classification Search
CPC .......... G06F 30/00; G06F 30/13; G06F 30/12; G06F 2111/18; F21S 4/10; F21W 2121/04; H05B 47/19; H05B 47/175
USPC ......................................................... 703/4, 3
See application file for complete search history.

(56) References Cited

U.S. PATENT DOCUMENTS

| | | | | |
|---|---|---|---|---|
| 2010/0226617 A1 | | 9/2010 | Piccionelli | |
| 2011/0245939 A1 | * | 10/2011 | Crookham | ........... H05B 47/175 700/90 |
| 2013/0058583 A1 | * | 3/2013 | Gallagher | ............. G06F 16/583 382/224 |
| 2015/0154808 A1 | * | 6/2015 | Engelen | ............ G06Q 30/0621 715/771 |
| 2018/0133597 A1 | * | 5/2018 | Biondo | .................... A63F 13/52 |

FOREIGN PATENT DOCUMENTS

| | | | |
|---|---|---|---|
| WO | 2017029061 | 2/2017 | |
| WO | WO-2017029061 A | * 2/2017 | ........... G06F 3/0488 |

* cited by examiner

*Primary Examiner* — Cedric Johnson
(74) *Attorney, Agent, or Firm* — Themis Law

(57) ABSTRACT

A method of arranging a plurality of lighting fixtures in a room or on an object includes the steps of: (a) producing a virtual model of the room or the object in or on which the lighting fixtures are to be placed; (b) virtually arranging the lighting fixtures on the virtual model; (c) identifying one or more guide lighting fixtures in the virtual arrangement, based on one or more predetermined positions; (d) generating a sequence of actuation of the lighting fixtures, which actuates at least the guide lighting fixtures; and (e) arranging the lighting fixtures so that at least the position of the guide lighting fixtures coincides with the position thereof at steps (b) and (c).

9 Claims, 3 Drawing Sheets

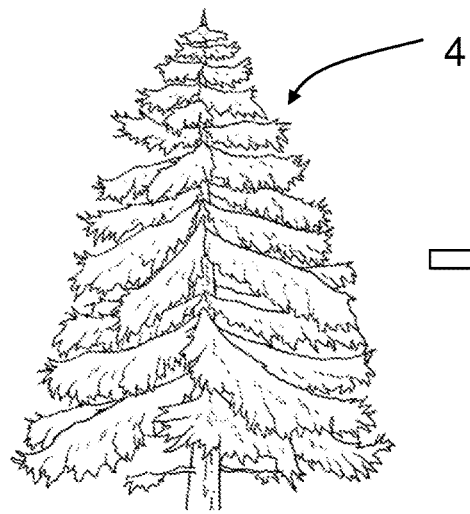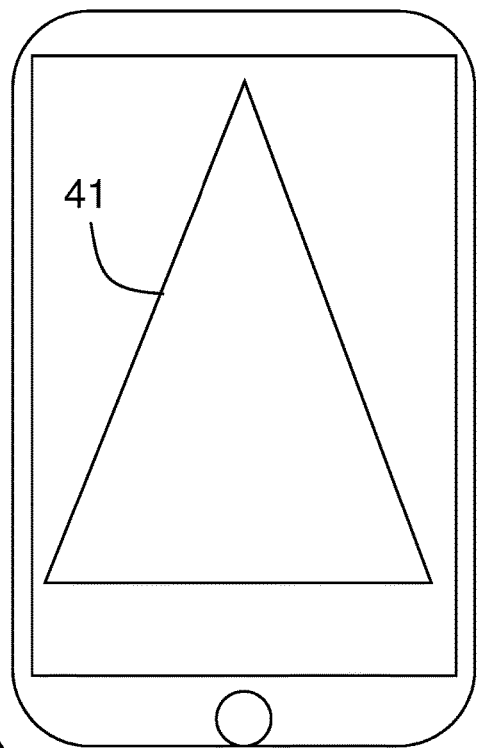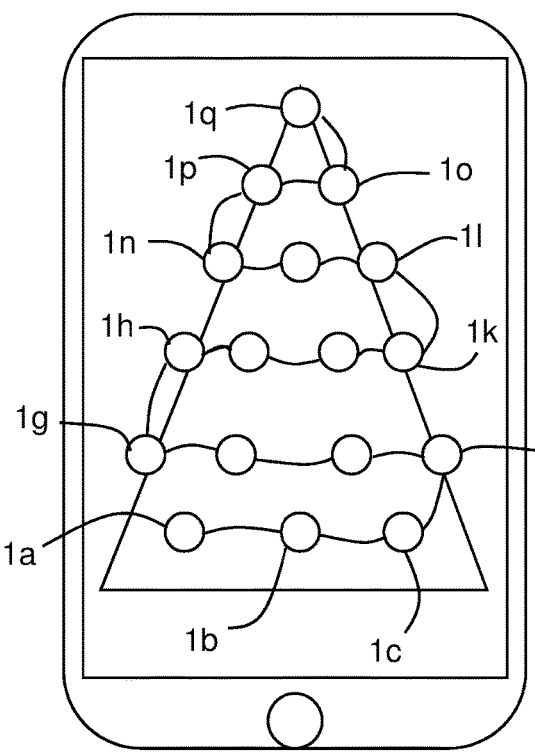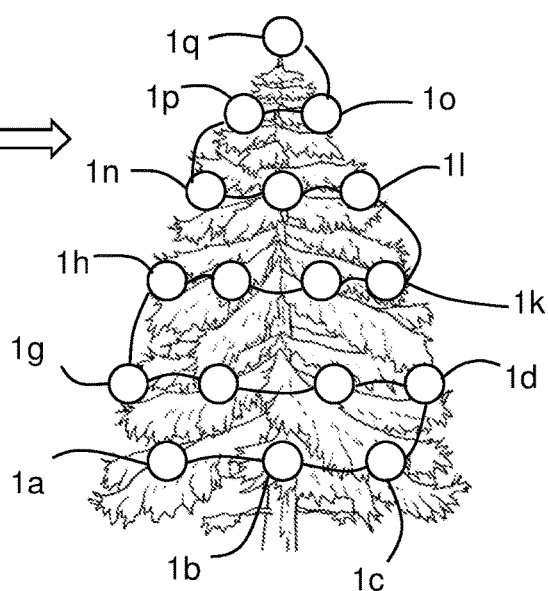
Fig. 2a
Fig. 2b
Fig. 2c
Fig. 2d

METHOD AND SYSTEM FOR DISPOSING A PLURALITY OF LIGHTING DEVICES

The present invention relates to a method of arranging a plurality of lighting fixtures in a room or on an object.

The present invention addresses methods and systems for light control, particularly designed for the setup step that precedes the control step, in which lights are arranged in the room or on an object.

A typical application, that does not limit the present invention, relates to Christmas luminaires.

Christmas decorations are known in the art to be formed with white or colored lights that may suspended from balconies or laid on the Christmas tree or the crèche.

Various types of Christmas decorations are currently available, from the simplest arrangements in which light fixtures are simultaneously turned on and off, to more complex arrangements in which the lighting fixtures, preferably LEDs, may be turned on according to various programmed sequences.

In a common cost-effective solution, the LEDs are connected to a power supply that can individually control power supply to each LED.

LEDs known as "addressable LEDs", "LED chips" or "LED pixels" have been recently introduced into the market, and may be individually controlled by means of a communication bus. For example, the integrated circuit WS2812 by WorldSemi® can receive input data and output it to cascade different chips and control an RGB (Red, Green and Blue) LED in which it is incorporated.

Flexible light strips with cascaded LED pixels are now available, which have a connector at one end for connection to an external controller, whereby the individual LED pixels may be individually controlled to create different light effects.

Therefore, many inventions relate to the control of lighting fixtures, such as the one described in the document WO2017/115326.

Nevertheless, prior art control methods and systems do not consider the initial setup step, i.e. the step of arranging the lighting fixtures.

According to the type and number of such lighting fixtures, the latter may be arranged in a variety of patterns, e.g. a spiral pattern, various regular or irregular geometric patterns, and also in different installations, i.e. on an object or in a room, e.g. with the various lighting fixtures hanging therein.

It will be appreciated that successful control of the lighting fixtures, leading to aesthetically valuable choreographies, is strictly dependent on a careful and accurate arrangement of the lighting fixtures.

Therefore, there exists a need, yet unfulfilled in prior art methods and systems, for a method and a system that allows a user to carefully arrange a plurality of lighting fixtures, to effectively obtain pleasant effects as the lighting fixtures are turned on.

The present invention fulfills the aforementioned purpose by providing a method of arranging a plurality of lighting fixtures in a room or on an object, which includes the steps of:

a) producing a virtual model of the room or the object,
b) virtually arranging the lighting fixtures on said virtual model,
c) identifying one or more lighting fixtures having a guide purpose in the virtual arrangement, based on one or more predetermined positions,
d) generating a lighting fixture actuation sequence, actuating at least the guide lighting fixtures,
e) arranging the lighting fixtures such that at least the position of the guide lighting fixtures will coincide with the position thereof at the steps b) and c).

It will be appreciated that the key of the invention is the identification of a few guide devices that help the user to arrange the lighting fixtures according to the pattern of the virtual arrangement.

This will provide a guide for the user, who will have instructions on how to place the various lighting fixtures.

As more clearly shown from the description of a few exemplary embodiments, the actuation sequence may be composed of a pattern of lighting states of the different lighting fixtures, such as on/off, or different lighting colors, according to the number and position of the guide lighting fixtures.

It shall be understood that the step of d) generating an actuation sequence for turning on the guide lighting fixtures, is intended to create any actuation sequence that can afford identification and easy recognition of the guide lighting fixtures.

As described below, an actuation sequence may be provided for example, that only actuates the guide lighting fixtures, or actuates the guide lighting fixtures with one or more colors differing from the other lighting fixtures.

It will be also appreciated that the method of the present invention addresses both real and virtual lighting fixtures.

By providing a virtual arrangement of the lighting fixtures, under step b), the method of the present invention implies the generation of a pattern of a plurality of virtual lighting fixtures.

Each virtual lighting fixture will have a single real lighting fixture uniquely corresponding thereto.

Likewise, the virtual lighting fixtures identified as "guide" fixtures will also have real "guide" lighting fixtures corresponding thereto.

Thus, it will be understood that the steps b) and c) relate to virtual lighting fixtures, whereas the step d) relates to real lighting fixtures.

In a possible variant embodiment, the method of the present invention includes a step of acquiring an image of the room or the object in or on which the lighting fixtures are to be placed.

This step may be carried out in any order, but is preferably carried out before generation of the virtual model.

This step is particularly advantageous, as better explained below, for automatic generation of the virtual model.

Algorithms may be used to recognize specific shapes from the acquired images of the room or the object, and to automatically generate a virtual model of the room or the object in or on which the lighting fixtures are to be placed.

Furthermore, the virtual arrangement may be carried out according to various parameters, which will have an immediate effect on the light effects that will be created, once the lighting fixtures are positioned. In a preferred embodiment, one of the parameters may be homogeneity, which means that the virtual arrangement is formed with a homogeneous distribution of the lighting fixtures on the outer surface of the object or in the environment selected for installation. The guide lighting fixtures may represent some or all of the lighting fixtures of said plurality.

For easier arrangement of the lighting fixtures by a user, in a possible embodiment of the method of the present invention, the plurality of lighting fixtures are divided into two or more groups based on their position on the virtual model, whereupon diversified actuation may be provided for each group.

The groups may be advantageously associated with zones of the virtual model, such that the lighting fixtures that shall be placed in a predetermined zone may be lit with a given color and the lighting fixtures of another zone may be actuated with a different color.

Instead of or in addition to the above, the user may identify certain zones of interest for diversified actuation of the lighting fixtures belonging to those zones from the other fixtures.

Alternatively, the user does not only identify a zone of interest but can also select one or more lighting fixtures that may act as guide lighting elements.

Advantageously, the method of the present invention provides high interactivity between the user and the system, to afford, if needed, a highly discretionary choice in the arrangement of the lighting fixtures.

According to the method of the present invention, the step of acquiring the image of the object or the room in or on which the lighting fixtures are to be placed may be carried out, for example, by capturing an image that affords extrapolation of a virtual model.

Advantageously the user may be designed to select a geometric figure that approximates the environment or the object in or on which the lighting fixtures are to be placed.

Here, the virtual model will coincide with the selected geometric figure.

This feature allows optimization of the computational requirements of the virtual arrangement, due to the use of simple shapes from known geometry.

According to this variant the guide lighting fixtures may be identified as devices located at predetermined points of the geometric figure such as edges, vertices, corners, center, centroid, etc.

The geometric figure may also be determined automatically, as a result of the acquisition: this will occur by automatic recognition of known geometric shapes that approximate the object on which the lighting fixtures are to be placed.

Finally, in a possible variant embodiment, the method of the present invention includes a checking step, which has the purpose to acknowledge proper positioning of the guide lighting fixtures, by comparing the final arrangement step with the calculated virtual arrangement.

The checking step may be carried out either when all the lighting fixtures have been arranged, or prior to final arrangement, for instance after arranging a given number of lighting fixture.

In the latter case a real-time check will be provided, with signal alarms being generated if the lighting fixtures are not properly positioned.

Alternatively, an image of the arrangement will be acquired and compared with the image of the virtual arrangement.

The method of the present invention is particularly advantageous not only during setup and arrangement of the lighting fixtures, but also in the later creation of light settings by actuation of the lighting fixtures.

Combined generation of the virtual model and identification of guide devices, will afford not only proper arrangement of the fixtures, but also identification of the spatial position of each lighting fixture.

The lighting fixtures that are actually placed in the environment or on the object of interest will exactly match the lighting fixtures of the virtual model, whereby their position in space will correspond to their known "virtual" position on the model.

This arrangement will afford separate and independent identification and control of each lighting fixture to create any kind of lighting fixtures, similar but alternative to what has been described in WO2017/115326.

The present invention also relates to a lighting system comprising a plurality of lighting fixtures and a control unit, which is connected to said plurality of lighting fixtures and is adapted to individually control the actuation of each of said lighting fixtures.

The control unit is configured to implement the above described method steps.

As described above, the lighting fixtures may consist of LED light fixtures, which are known in the art.

The LEDs of the system of the present invention may be driven individually, but advantageously are electrically connected in series.

Alternatively, the LEDs may be independent elements, which wirelessly receive, for example, actuation signals, without requiring changes to the method or of the system of the present invention.

Advantageously, as better explained in the description of a few exemplary embodiments, the control unit comprises an actuation unit and a user device, which is adapted to communicate with said actuation unit.

The actuation unit is directly connected to the lighting fixtures and imparts actuation controls to the lighting fixtures, whereas the user device is the interface of the system with a user.

These and other features and advantages of the present invention will appear more clearly from the following description of a few embodiments, illustrated in the annexed drawings, in which:

FIGS. 2a to 2d show a schematic of the steps of the inventive method of arranging lighting fixtures;

It shall be noted that the figures annexed to the present application depict certain embodiments of the system and method of the present invention, to provide an improved understanding of its advantages and the described characteristics.

These embodiments shall be intended by way of illustration only and without limitation to the inventive concept of the present invention which provides a method of arranging lighting fixtures that affords accurate distribution of the various fixtures, and generation of aesthetically valuable special effects and light patterns.

As mentioned above, the method and system of the present invention may be used in any environment and with any object adapted for installation of the lighting fixtures.

Nevertheless, for simplicity the figures show the object on which the lighting fixtures are placed as a Christmas tree.

Figure 1:
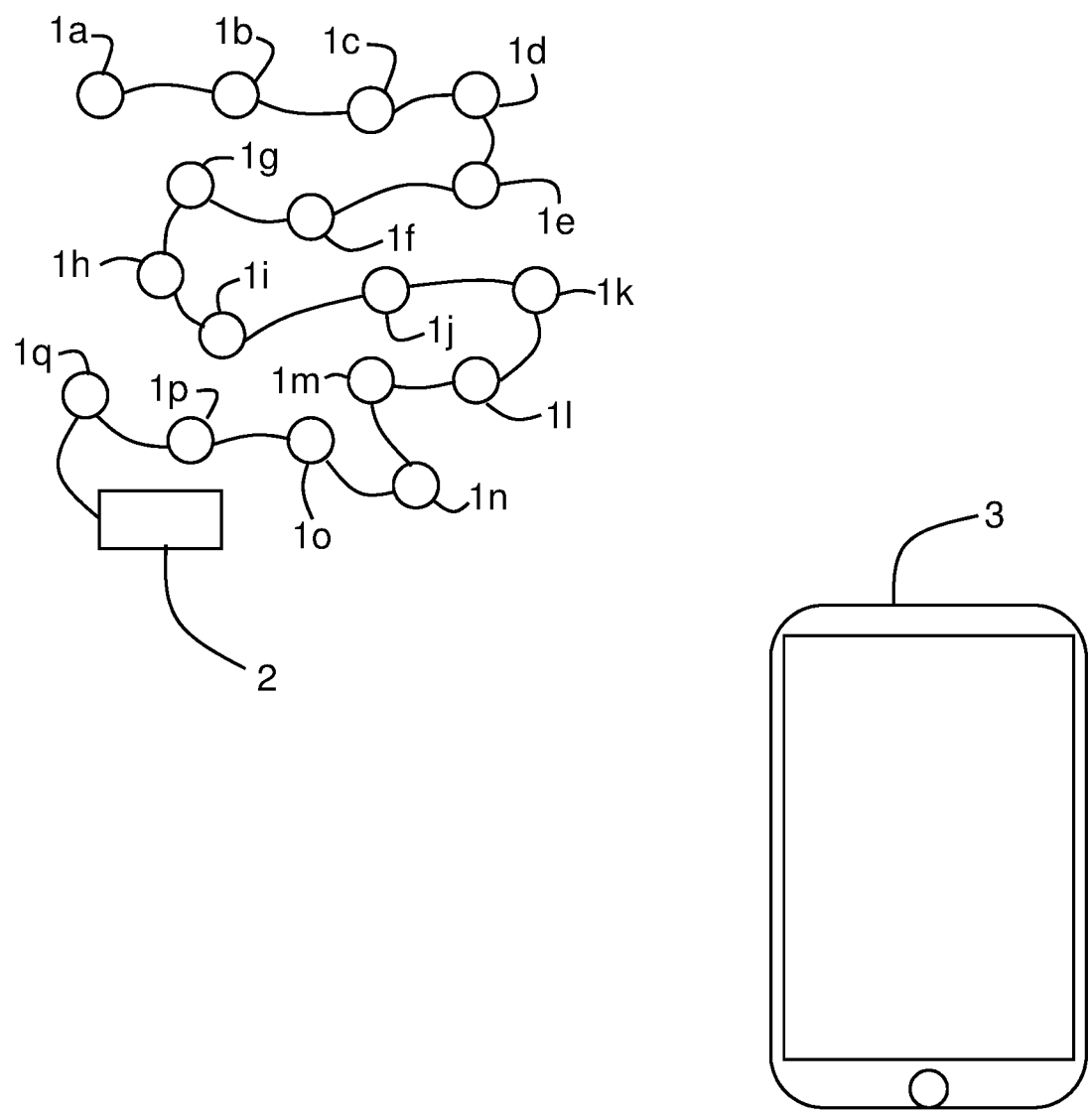
FIG. 1 shows a schematic of the lighting system of the present invention.

Particularly, FIG. 1 shows a variant embodiment of the system of the present invention.

The system comprises a plurality of lighting fixtures, referenced $1a$ to $1q$, which are electrically connected by a known electric wire.

The lighting fixtures $1a$-$1q$ may consist, for instance, of multicolor LEDS $1a$-$1q$.

The LEDS $1a$-$1q$ are connected to an actuation unit 2, which is adapted to individually control the actuation of each LED.

The actuation unit 2 is also controlled by a user device 3, consisting of a smartphone device or the like.

Figure 3:
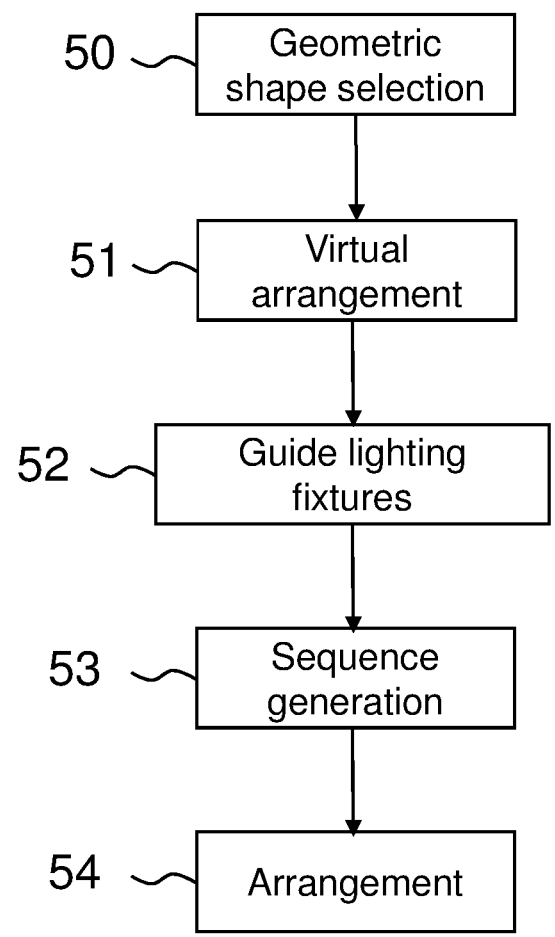
FIG. 3 shows a block diagram of a preferred variant embodiment of the method of the present invention.

The smartphone 3 wirelessly communicates with the actuation unit 2 and their cooperation will cause the execution of the above described method steps, as shown in FIGS. 2a to 3.

As mentioned above, the actuation unit 2 and the user device 3 are not essential to the system, which only requires a control unit (not shown) that can individually actuate each LED and interface with a user.

For example, a device connected to the LEDS 1a-1q, having a display and an input-output interface, allowing a user to select a geometric shape and create the virtual model and view the arrangement of the LEDS, may be sufficient for the execution of the method of the present invention.

When a smartphone 3 and an actuation unit 2 are provided, the intelligence, i.e. the processing unit that carried out the method steps, is entirely incorporated in the smartphone 3: the smartphone 3 sends control instructions to light the LEDs 1a-1q via a software application loaded in the smartphone 3.

Such software application will cause the execution of the steps of the method, namely the method as shown in FIGS. 2a to 3.

With reference to FIGS. 2a-2d, assume that a user wants to arrange the LEDS 1a-1q on the tree 4.

In FIGS. 2a-2d, the arrangement selected by the user is an arrangement in which the LEDS 1a-1q are evenly distributed on the outer surface of the tree 4.

While the figures show an even two-dimensional distribution for simplicity, it will be understood that the method of the present invention may be also carried out with three-dimensional shapes.

The user selects a geometric shape, step 50 of FIG. 3, which approximates the shape of the object on which the LEDS 1a-1q are to be placed: in this case, the user selects a triangle that best approximates the tree 4, in shape, size and proportions.

The triangle will thus constitute the virtual model 41, as shown in FIG. 2b, which will be used to create a virtual arrangement of the LEDs 1a-1q, as shown in FIG. 2c and in step 51 of FIG. 3.

In a possible embodiment, the user may acquire an image of the object on which the LEDs are to be placed and the software application may automatically calculate the geometric shape that best approximates the object.

Alternatively, once the image has been acquired, the user may swipe his/her finger on the smartphone 3 to outline the edges of the geometric figure and approximate the object on which the LEDS are to be placed.

Regardless of how the image of the object has been acquired, the method of the present invention uses the virtual model 41 to create a virtual arrangement of the LEDs 1a-1q, as shown in FIG. 2c: here the virtual arrangement assumes an even distribution of the LEDS 1a-1q along the outer surface of the tree 4.

The virtual arrangement of FIG. 2c obviously relates to a virtual pattern of the lighting fixtures 1a-1q.

The numerals that designate the lighting fixtures in the accompanying figures are the same for both the real lighting fixtures (FIG. 1 and FIG. 2d) and for the virtual lighting fixtures (FIG. 2c), to confirm the unique match between each virtual lighting fixture and each real lighting fixture.

A step may be provided for associating the virtual lighting fixtures and the real lighting fixtures.

The system may indeed create virtual representations of the lighting fixtures 1a-1q corresponding to the real lighting fixtures.

For example, this may be obtained by using the number of lighting fixtures and possibly the length of the LED strip as inputs.

Alternatively, each LED strip may be identified with an identification code, and the actuation unit 2 will transmits such identification code to the user device 3.

The user device 3 may store databases containing information that associate each identification code with a specific virtual pattern corresponding, e.g. by number of LEDs and length, to the real LED strip 1a-1q.

Back to the description of FIGS. 2a-3, the even distribution may be easily calculated by the software application loaded in the smartphone 3, using algorithms known in the art.

Once the shape has been selected and the number of LEDs 1a-1q is known, the software application will calculate how to evenly cover the surface evenly, considering that the LEDs are electrically connected by a wire.

Now, in step 52, certain LEDs that may act as "guides" will be identified.

The choice of the guide LEDs changes according to the selected shape of the virtual model 41: it is generally advisable to choose LEDS placed in particular positions, such as LEDs placed on the edges, or at "turning points" of the wire.

As mentioned above, the "guide" LEDs may be selected either automatically, or manually by a user that imparts instructions.

In the particular case of FIGS. 2a-2d, the LEDs at the edges, namely 1d, 1g, 1h, 1k, 1l, 1n, 1o, 1p, 1q, will be advantageously defined as guide LEDs.

The LEDS 1d, 1g, 1h, 1k, 1l, 1n, 1o, 1p, 1q may be thus automatically identified by the system as LEDS placed on the edges of the Christmas tree.

Alternatively, these LEDS may be selected by the user, for example by swiping his/her finger on the edges of the Christmas tree, or by selecting the LEDS with a touch of the screen at all the points in which the LEDs that the user wants to identify as "guides" are located.

Due to the unique association between the virtual LEDs of FIG. 2c and the real LEDs of FIG. 1 and FIG. 2d, the LEDS now identified as guides will be actuated by a specific sequence, step 53, sent to the LEDs via the actuation unit 2.

Referring to FIG. 2c, the LEDS 1g, 1h, 1n, 1p (left edge) may be lit with a blue light, and the LEDS 1d, 1k, 1l, 1 (right edge) may be lit with a green light.

Also, the actuation sequence may be designed to actuate the LEDS 1a and 1q (start and end LEDs) with a red light.

In a possible embodiment, the user can view the guide LEDS on the display of the smartphone 3, with the aforementioned colored lights, for the user to have an immediate feedback of the arrangement of the various LEDs on the tree 4, as shown in FIG. 2d.

Now the user will find the arrangement of the LEDS 1a-1q as shown in FIG. 1, i.e. the LEDS placed in random, sparse arrangement, but with certain LEDs lit with different colors.

Based on the virtual model of FIG. 2c, the user may begin to arrange the LEDS 1a-1q on the tree 3, step 54, such that the blue LEDs will be all located on the left side of the tree 31, the green LEDs will be located on the right side of the tree 3 and the red LEDs at the beginning and the end of the LED strip 1a-1q.

This will provide an even distribution of the LEDS 1a-1q, as shown in FIG. 2d.

While the figures obviously show a 2D pattern, it will be appreciated that the method as described above may be easily implemented even in the case of FIG. 3d, for instance by selecting a virtual model 41 consisting of a three-dimensional shape.

Furthermore, the identification of the guide lighting fixtures obtained through the selection of the lighting fixtures that can be found in certain "strategic" positions allows the method of the present invention to be adapted to any object or any installation environment.

The invention claimed is:

1. A method of arranging a plurality of lighting fixtures in an environment or on an object, comprising:
    (a) producing a virtual model of the environment or the object, in or on which said plurality of lighting fixtures are to be placed;
    (b) virtually arranging said plurality of lighting fixtures to produce a virtual arrangement on said virtual model;
    (c) identifying one or more guide lighting fixtures in said virtual arrangement, based on one or more predetermined positions;
    (d) generating an actuation sequence of said plurality of lighting fixtures, said actuation sequence actuating at least said guide lighting fixtures; and
    (e) arranging said plurality of lighting fixtures so that at least a position of said guide lighting fixtures coincides with the position thereof at steps (b) and (c),
    wherein step (c) includes dividing the plurality of lighting fixtures into two or more groups based on their position on the virtual model, each group being actuated in a different manner.

2. The method as claimed in claim 1, further comprising a step of acquiring an image of the environment or the object in or on which said plurality of lighting fixtures are to be placed.

3. The method as claimed in claim 2, wherein a geometric shape is identified, for approximating the environment or the object in or on which said plurality of lighting fixtures are to be placed.

4. The method as claimed in claim 3, wherein the guide lighting fixtures are identified as devices located at predetermined points of said geometric shape.

5. The method as claimed in claim 1, wherein step (b) includes creating an even distribution of said plurality of lighting fixtures.

6. The method as claimed in claim 1, further comprising a checking step for comparing step (e) with the step (b).

7. A lighting system comprising:
    a plurality of lighting fixtures; and
    a control unit, connected to said plurality of lighting fixtures and adapted to individually control an actuation of each of said plurality of lighting fixtures,
    wherein the control unit is configured to implement the following steps:
    (a) producing a virtual model of an environment or an object, in or on which said plurality of lighting fixtures are to be placed;
    (b) virtually arranging said plurality of lighting fixtures to produce a virtual arrangement on said virtual model;
    (c) identifying one or more guide lighting fixtures in said virtual arrangement, based on one or more predetermined positions;
    (d) generating an actuation sequence of said plurality of lighting fixtures, said actuation sequence actuating at least said guide lighting fixtures; and
    (e) arranging said plurality of lighting fixtures so that at least a position of said guide lighting fixtures coincides with the position thereof at steps (b) and (c),
    wherein step (c) includes dividing the plurality of lighting fixtures into two or more groups based on their position on the virtual model, each group being actuated in a different manner.

8. The lighting system as claimed in claim 7, wherein said plurality of lighting fixtures are electrically connected.

9. The lighting system as claimed in claim 7, wherein the control unit comprises an actuation unit and a user device, which is adapted to communicate with said actuation unit.

* * * * *